United States Patent [19]
Redditt

[11] Patent Number: 5,320,068
[45] Date of Patent: Jun. 14, 1994

[54] AUTOMATIC OXYGENATION SYSTEM FOR AQUACULTURE

[76] Inventor: R. Bardin Redditt, 204 Grand Blvd., Greenwood, Miss. 38930

[21] Appl. No.: 920,818

[22] Filed: Jul. 28, 1992

[51] Int. Cl.$^5$ .............................................. A01K 63/04
[52] U.S. Cl. ..................................... 119/226; 210/170
[58] Field of Search ........................ 119/3, 5; 210/170

[56] References Cited

U.S. PATENT DOCUMENTS

| | | | |
|---|---|---|---|
| 2,633,884 | 1/1962 | Holmes et al. | 261/122 |
| 3,040,980 | 6/1962 | Mann et al. | 235/98 |
| 3,320,928 | 5/1967 | Smith | 119/3 |
| 3,452,966 | 7/1969 | Smolski | 261/77 |
| 3,505,213 | 4/1970 | Anthony et al. | 210/15 |
| 3,716,025 | 2/1973 | Lawson | 119/3 |
| 3,747,904 | 7/1973 | Gross | 261/92 |
| 3,805,224 | 4/1974 | Wenz | 119/3 |
| 3,863,605 | 2/1975 | Gallup | 119/3 |
| 3,956,124 | 5/1976 | Fast et al. | 210/63 R |
| 4,034,030 | 7/1977 | Bracey | 261/64 D |
| 4,044,720 | 8/1977 | Fast et al. | 119/3 |
| 4,101,608 | 7/1978 | Bracey | 261/36 R |
| 4,116,164 | 9/1978 | Shabi et al. | 119/3 |
| 4,183,322 | 1/1980 | Shultz et al. | 119/4 |
| 4,203,389 | 5/1980 | Gasper, Jr. et al. | 119/3 |
| 4,441,452 | 4/1984 | Strain, Jr. | 119/3 |
| 4,626,992 | 12/1986 | Greaves et al. | 364/418 |
| 4,654,147 | 3/1987 | Bagley | 210/774 |
| 4,657,675 | 4/1987 | Zan | 210/170 |
| 4,723,511 | 2/1988 | Solman et al. | 119/3 |
| 4,743,742 | 5/1988 | Espedalen | 235/1 R |
| 4,906,359 | 3/1990 | Cox, Jr. | 210/170 |
| 4,910,912 | 3/1990 | Lowrey, III | 47/62 |
| 4,972,801 | 11/1990 | Hunt | 119/3 |
| 5,081,954 | 1/1992 | Monus | 119/3 |

FOREIGN PATENT DOCUMENTS

| | | | |
|---|---|---|---|
| 2634573 | 1/1990 | France. | |
| 455725 | 2/1975 | U.S.S.R. . | |
| 588959 | 1/1978 | U.S.S.R. | 119/3 |
| 789079 | 12/1980 | U.S.S.R. | 119/3 |
| 959717 | 9/1982 | U.S.S.R. . | |
| 970408 | 10/1982 | U.S.S.R. . | |
| 973085 | 11/1982 | U.S.S.R. | 119/3 |
| 995716 | 2/1983 | U.S.S.R. . | |
| 1056970 | 11/1983 | U.S.S.R. . | |
| 1172508 | 8/1985 | U.S.S.R. | 119/3 |
| 1604305 | 11/1990 | U.S.S.R. . | |

OTHER PUBLICATIONS

Derrow II et al., "A Narrow-Beam Scanning Sonar for Shallow Aquaculture Ponds", NCPA Report KEG-0-1-89, National Center for Physical Acoustics, University Ms., Jan. 1989.

Primary Examiner—John G. Weiss
Assistant Examiner—Todd E. Manahan
Attorney, Agent, or Firm—Nixon & Vanderhye

[57] ABSTRACT

Systems for automatically controlling a supply of oxygen to a fish pond (122) are disclosed. The systems include a primary aerator (126) under the control of a controller (128), as well as a fish monitor (130) for monitoring the activity of fish in the pond. The controller determines whether the monitored activity of the fish is indicative of oxygen depletion in the volume of water and, in response to the determination, activates the primary aerator. In one embodiment, a sample or reference aerator (175) creates an oxygen-rich sub-volume (172) wherein activity of the fish is monitored.

25 Claims, 11 Drawing Sheets

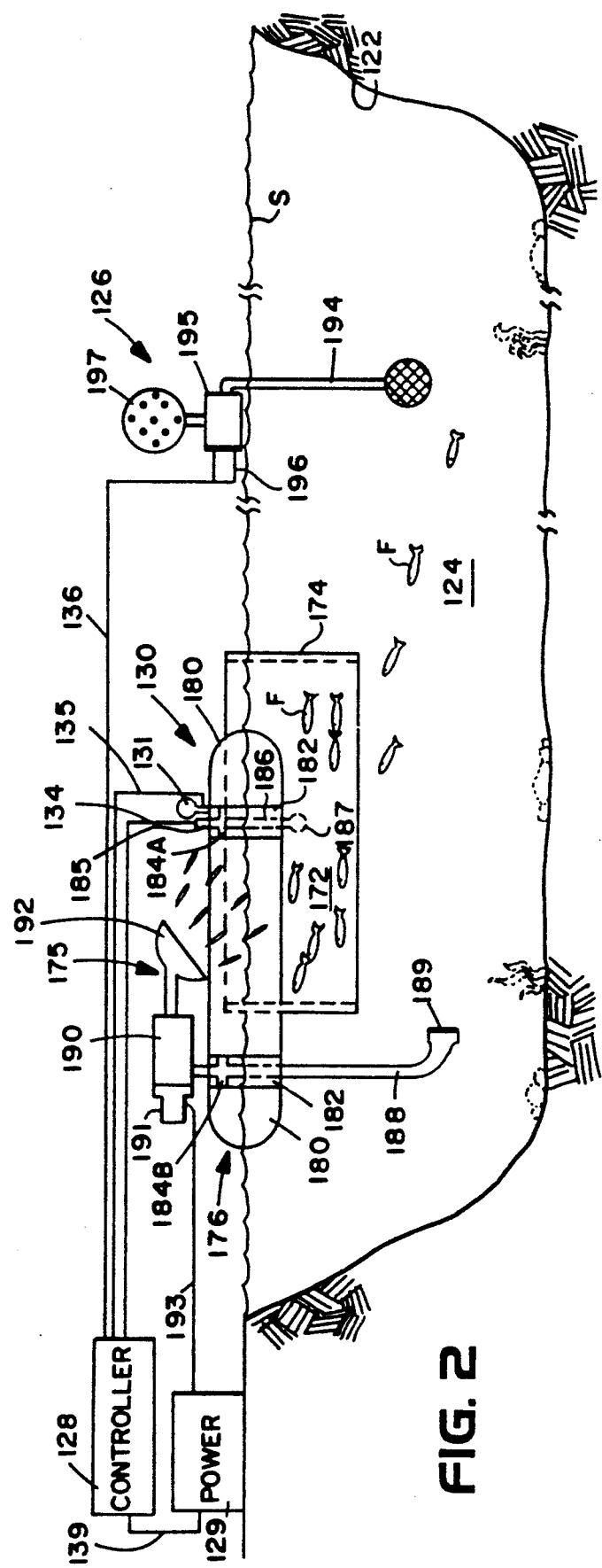

AUTOMATIC OXYGENATION SYSTEM FOR AQUACULTURE

BACKGROUND

1. Field of Invention

This invention pertains to method and apparatus for supplying oxygen to bodies of water used in aquaculture, and particularly to an automatic system for determining the need for oxygen and controlling the operation of aeration equipment employed therefor.

2. Prior Art and Other Considerations

The aquaculture industry has grown substantially in the last twenty-five years. Since the mid-1960s, the catfish farming industry has grown from a start-up industry to one that has produced over 400 million pounds of fish during 1991. Shrimp farming has also seen a very rapid growth curve, as well as other species of marine animals.

With the growing technology associated with the aquaculture industry, increased poundage is being produced from a given quantity of water. As a result, increased emphasis is placed on the quality of the water. One of the most critical components of water quality is oxygen content.

During daylight hours oxygen is produced in the water by photosynthesis. Oxygen depletion generally occurs during the night or early morning hours. Accordingly, in the catfish industry most of the monitoring for oxygen depletion is conducted by night crews armed with oxygen meters. In this regard, the oxygen level of a catfish pond is monitored periodically and the oxygen reading recorded. As the need for additional oxygen becomes apparent, aeration equipment is manually activated by the personnel of the night crew. Often, once supplemental aeration is begun, the tendency is to continue running it as a precaution long after the need is satisfied. This adds to the cost of aeration.

Several automated prior art devices or meters for monitoring oxygen in ponds have been developed based on an oxygen reading probe tied electronically to systems that turn on aeration equipment and send alarms. These type systems are rather temperamental and require repeated checking and calibration. These systems can be contaminated or otherwise affected by growths in the ponds. In addition, these systems are relatively expensive.

Another serious drawback to aeration systems based on oxygen probes are is the fact that an oxygen probe only determines the oxygen at one location and at one depth. A catfish pond may be ten to twelve acres or more in size, with an average depth of about four feet.

A further drawback is that the oxygen content of the water as measured by an oxygen probe, even if at a level that normally is adequate to avoid stress, may in fact be inadequate to prevent stress, and ultimately death, due to the physical condition of the fish. This situation may result from several common maladies that affect fish such as anemia, nitrite poisoning, parasites on gills, and disease. In other words, fish are sometimes stressed at an oxygen level that is, under normal circumstances, considered quite adequate.

Accordingly, it is an object of the present invention to provide method and apparatus for automatically determining the need for and controlling aeration for aquaculture.

An advantage of the present invention is the provision of method and apparatus for economically controlling oxygen content for aquaculture without being labor-intensive.

A further advantage of the present invention is enhancement of the quality of aquacultural products.

SUMMARY

A system for automatically controlling a supply of oxygen to a volume of water (such as a fish pond wherein aquacultural creatures reside) includes at least one primary aerator under the control of a controller, as well as a monitor for monitoring the activity of aquacultural creatures residing in the pond. The controller determines whether the monitored activity of the fish is indicative of oxygen depletion in the volume of water and, in response to the determination, activates the primary aerator(s).

In one embodiment, a sample or reference aerator creates an oxygen-rich sub-volume in a predetermined location of the pond. The monitor monitors the activity of the fish with respect to the oxygen-rich sub-volume (e.g., movement of the fish into the oxygen-rich sub-volume and/or the number of fish in the sub-volume).

In another embodiment, the monitor is situated proximate the surface of the pond. In such embodiment, the monitor detects congregation of the fish in a location wherein the fish would otherwise not be prone to group except when suffering oxygen depletion.

The system includes a controller (e.g., a programmed processor) for making the determination whether the fish activity is indicative of oxygen depletion. In one mode of operation, upon an initial determination of oxygen depletion, the controller activates a verification stimulus (e.g., a light source) which, under non-depletion conditions, would sufficiently frighten the fish and de-populate the oxygen-rich sub-volume. After application of the stimulus the controller again checks the level of activity in the oxygen-rich sub-volume and, if the fish activity is indicative of oxygen depletion, activates both an alarm and the primary aerator(s). In a fail-safe mode, the controller checks a secondary fish monitor proximate the primary aerator to ensure satisfactory oxygen levels.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 2 is a side view of an illustrative example embodiment.

DETAILED DESCRIPTION OF THE DRAWINGS

Whereas historically oxygen meters and sensors have been employed to ascertain oxygen depletion for a pond or lake, the method and apparatus of the present invention capitalizes upon the innate ability of oxygen-dependent aquacultural creatures to detect oxygen depletion. The terms "aquacultural creatures" and fish are used interchangeably herein to mean any swimming creature which obtains oxygen from the water in which it swims. As explained below, oxygen depletion causes aquacultural creatures to exhibit peculiar behavior which can be monitored and used as a basis for controlling oxygenating equipment.

In the above regard, the nature of oxygen depletion in ponds is that the oxygen in the top-most layers is the most heavily oxygen laden. Therefore, as the oxygen supply decreases, fish will begin to appear near the surface of the body of water. As the oxygen continues to decrease, the fish will actually "pipe" at the air above the surface of the water. During this period of oxygen stress, fish will begin searching for areas of oxygen rich water. Fish have a natural tendency to follow any current hoping to find a supply of oxygen enriched water at the source of the current. An example of such behavior is a fish swimming up stream in a sluggish oxygen poor area to an area of oxygenated water found at the termination of an area of rapidly moving water such as a waterfall. Upon finding such an area, they will begin to congregate. It has been observed that fish will begin to gather at about 6 inches below the surface of an oxygen-enhanced area about 45 minutes before general pond surface "piping" occurs.

Figure 1:
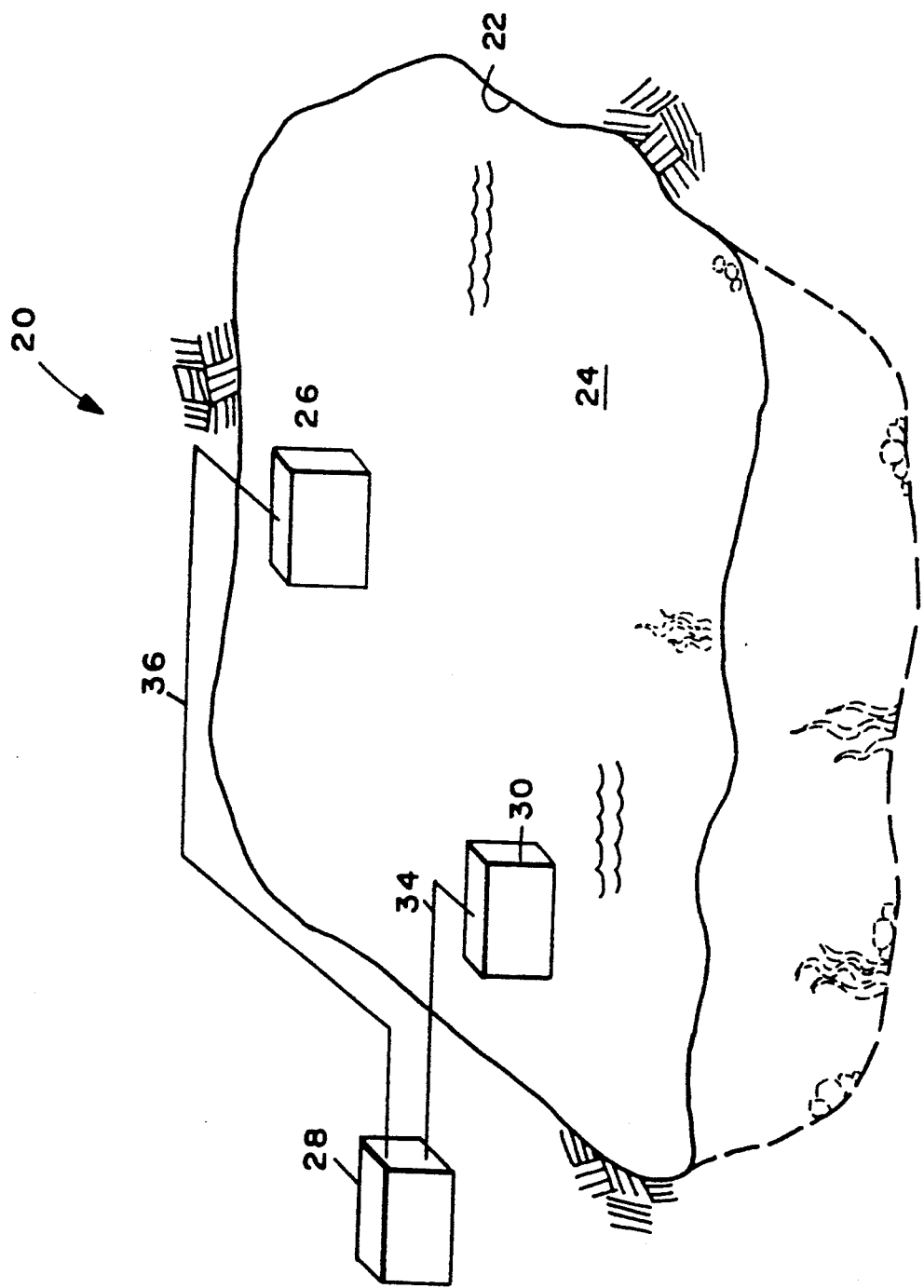
FIG. 1 is a schematic view of an automatic oxygenation system according to a mode of the invention for monitoring aquacultural activity proximate a surface of a volume of water.

FIG. 1 shows an automatic oxygenation system 20 for a pond 22 containing a volume of fresh water 24. The system 20 includes a primary oxygen-supplying aeration device 26; a controller 28; and, a fish monitor 30. The fish monitor 30 monitors the activity of fish and provides a signal on line 34 to the controller 28 indicative of the monitored activity. Examples of the activity monitored by the fish monitor 30 include the number and/or concentration of fish observed. The controller 28 uses the signals received from the fish monitor 30 to determine or ascertain whether the monitored activity of the fish indicates oxygen depletion in the pond 22. If an oxygen depletion condition is determined, the controller 28 activates the aeration device 26 by applying a suitable signal on line 36 to the aeration device 26.

The system 20 thus describes a general mode of the invention. As explained in detail with reference to other drawings hereof, the system can be configured and implemented in numerous ways.

FIG. 2 shows an automatic oxygenation system 120 which is an example installation of the system of FIG. 1 at a catfish pond 122. A volume 124 of fresh water is contained in the pond 122. The system 120 includes a primary oxygen-supplying aeration device 126; a controller (also known as a depletion determination controller) 128; a power supply 129; a fish monitor 130; and, a verification stimulator 131. The fish monitor 130 is connected by line 134 to the controller 128. The controller 128 is in turn connected by line 135 to the verification stimulator 131; by line 136 to the aeration device 126; and by line 139 to the power supply 129.

Figure 5:
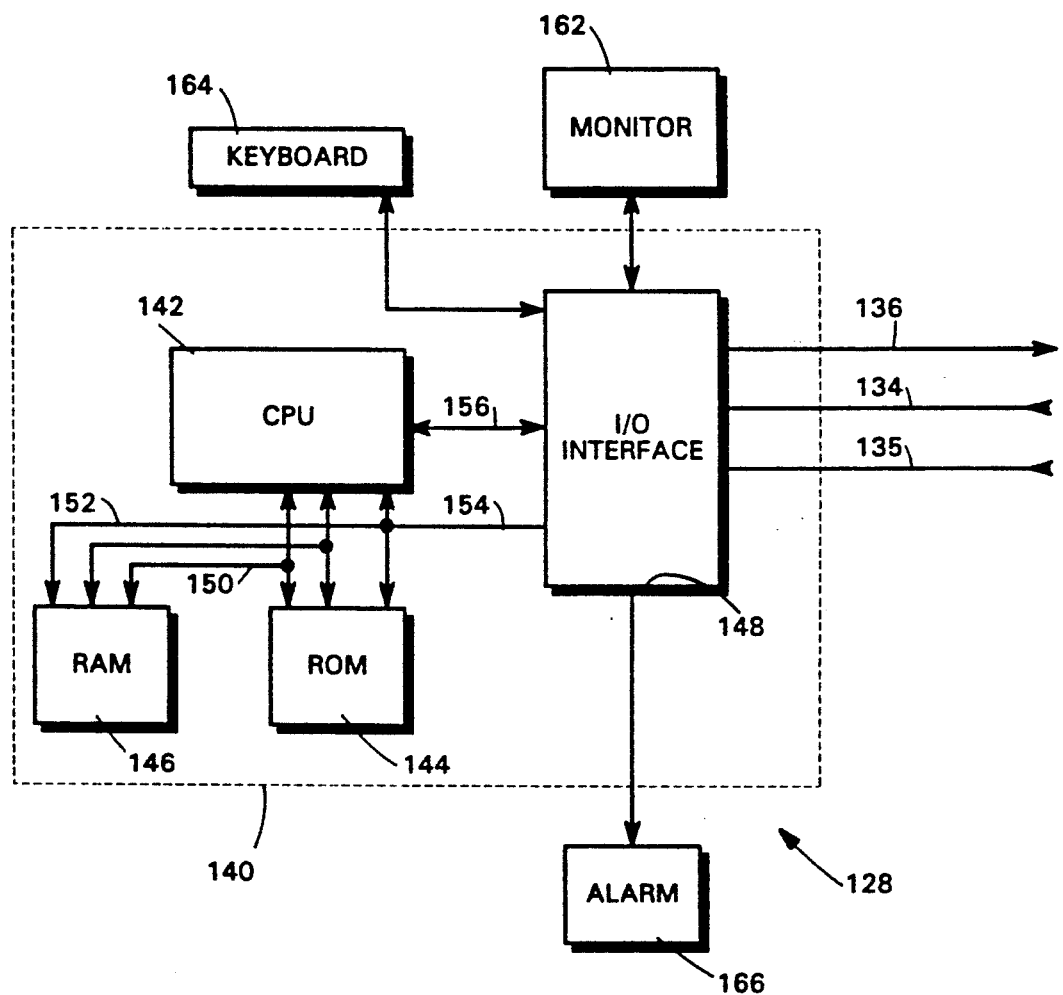
FIG. 5 is a schematic view of a controller of an embodiment of the invention.

As shown in FIGS. 2 and 5, the controller 128 of the system 120 is a computer housed in a cabinet 140. The controller 128 includes a central processing unit 142; a read-only-memory (ROM) 144; a random access memory (RAM) 146; and, one or more input/output interface devices (represented by I/O interface 148). An address bus 150, data bus 152, and control bus 154 connect various components of the controller as shown. The CPU 142 is connected to the I/O interface 148 by lines 156 for facilitating input and output operations. In addition to the connections to lines 134, 135 and 136 as previously described, the I/O interface 148 is also connected to a display monitor 162, an input device (keyboard 164); and, an audible alarm 166.

The system 120 of the embodiment of FIG. 2 further includes means 170 for creating an oxygen-rich subvolume in a predetermined location of the pond volume 124. The sub-volume creation means 170 creates a subvolume 172 which is richer in dissolved oxygen than adjacent water (e.g., richer in dissolved oxygen that the average level of dissolved oxygen in the volume 124 generally). The sub-volume creation means 170 includes a boundary frame 174; a sub-volume aerator 175 (also known as a sample or reference aerator) for oxygenating the sub-volume 172 defined by the frame 174; and, a flotation device 176 for supporting both the boundary frame 174 and the sub-volume aerator 175. The boundary frame 174 is an essentially topless and bottomless rectangular box which at least partially defines the subvolume 172.

Figure 4:
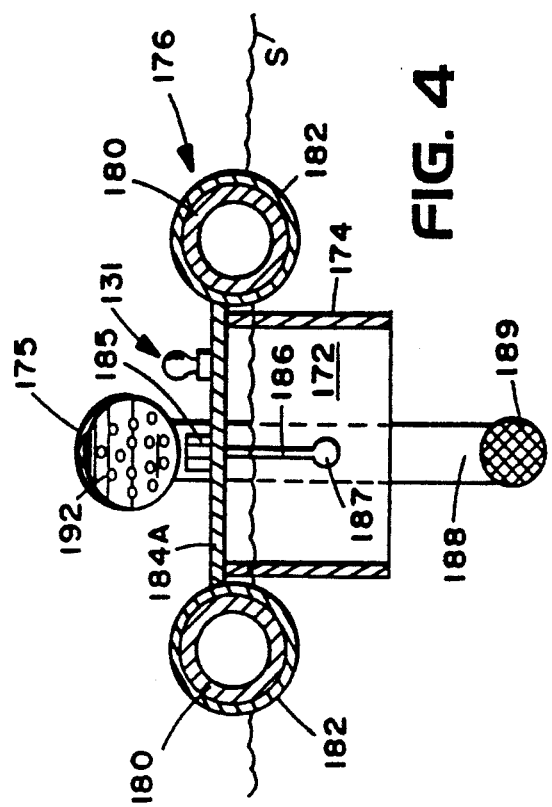
FIG. 4 is a sectioned view of the embodiment of FIG. 2 taken along the line 4—4 of FIG. 3.
Figure 3:
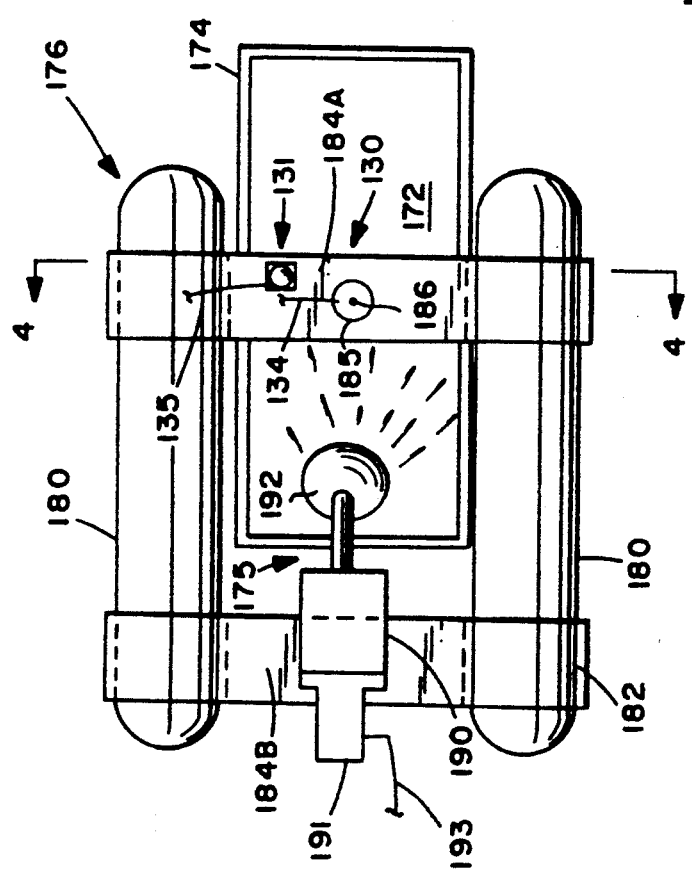
FIG. 3 is a top view of the embodiment of FIG. 2.

As shown in FIGS. 2-4, the flotation device 176 includes two elongated inflated tubes 180. Fore and aft portions of the tubes 180 are encircled by bands or straps 182. The two tubes 180 are maintained in parallel, spaced-apart relation by cross brace or bridge members, there being both a fore brace 184A and an aft brace 184B. The fore brace 184A carries the fish monitor 130 and the verification stimulator 131; the aft brace carries the sub-volume aerator 175.

The fish monitor 130 shown in FIGS. 2-5 is an electro-mechanical switch 185 (such as that manufactured by Cherry as model #6A884) which is connected by line 134 to the controller 128. The switch device includes a microswitch with a feeler wire or lever 186 which depends from the fore brace 184A and is essentially centrally disposed in the sub-volume 172. The feeler wire 186 is optionally provided with a bulbous foot 187.

The sub-volume aerator 175 mounted on the aft brace 184B comprises a submerged water intake tube 188 having a screen 189 provided on its inlet; a pump 190 into which the intake pipe 188 feeds; an electric motor 191 for driving the pump 190; and, a spray nozzle 192 connected to an outlet of the pump 190. The spray nozzle 192 is held aloft to direct an aerated spray of water into the sub-volume 172. The motor 191 is connected to the power supply 129 by an insulated line 193.

The sub-volume aerator 175 can be mounted on the aft brace 184B in any one of several manners. For example, the pump 190 and 191 may either lie stationary on the aft brace 184 or mounted slightly aloft. The intake tube 188 may extend through an aperture provided in the aft brace 184B or may be bracketed to a side thereof.

As understood with reference to FIG. 1, the aeration device 126 of the embodiment of FIG. 2 is located at a region of the pond 122 which is remote from the fish monitor 130. The particular aeration device 126 shown in FIG. 2 is a spray aerator which is similar in structure to, athough considerably larger and more powerful than, the sub-volume aerator 175 described above. In this regard, the aeration device 126 includes an intake tube 194; a pump 195; a motor 196 for driving the pump 196; and, a spray nozzle or spray head 197. Although not shown as such, it is understood that the motor 196 is connected to a power supply. The pump 195 is turned on and off by a signal received on line 136 from the controller 128.

Although not shown as such in the drawings, it should be understood that the flotation device 176 can be located in the pond 122 so that it does not move. For example, the flotation device 176 can be tied or otherwise secured to stakes driven into the bed of the pond 122 or supported by the structure of the primary aerator.

In the embodiment of FIGS. 2-5, the fish monitor 130 monitors the activity of fish proximate the surface S of the volume of water. As used herein, the term "proximate the/a surface of the volume of water" means above a predetermined depth below the surface S of the pond and/or above the surface S of the pond. For a catfish pond, the predetermined depth below the surface of the pond is approximately six inches.

The reason for positioning the fish monitor 130 of proximate the surface S of the pond will again be briefly explained. Catfish are considered "bottom fish", meaning that (under normal conditions) they almost exclusively feed and roam in the lower depths of a pond. Accordingly, ordinarily the population of catfish proximate the surface of a pond is essentially nil. However, when oxygenation of a pond is insufficient, in accordance with the innate phenomena above described catfish will appear near the surface of the pond and may eventually "pipe" at the air above the surface of the water. Provision of fish monitor 130 strategically facilitates detection of the presence of catfish near the surface of the pond.

Figure 6:
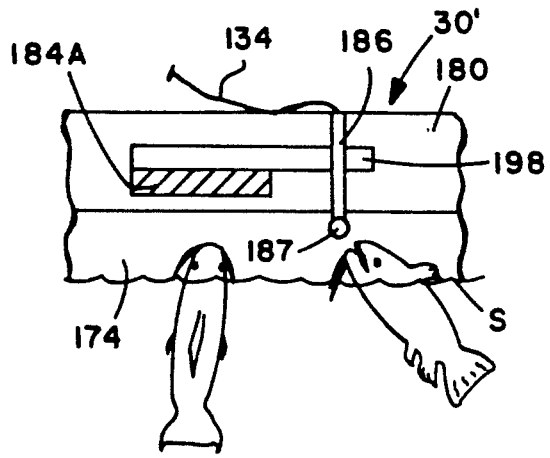
FIG. 6 is a partial side view, partially sectioned, of another illustrative example embodiment of the invention.

FIG. 6 shows a variation of the embodiment of FIGS. 2-5 wherein the switch 175 comprising fish monitor 30' is held aloft on the fore brace 184A. In particular, the feeler wire 186 of the switch 175 is held by a clamp member 198 so that the bulbous foot 187 of the switch 175 is positioned just above the surface S of the water level. The fish monitor 30' detects the physical presence of catfish which project their heads up above the surface S.

Figure 7:
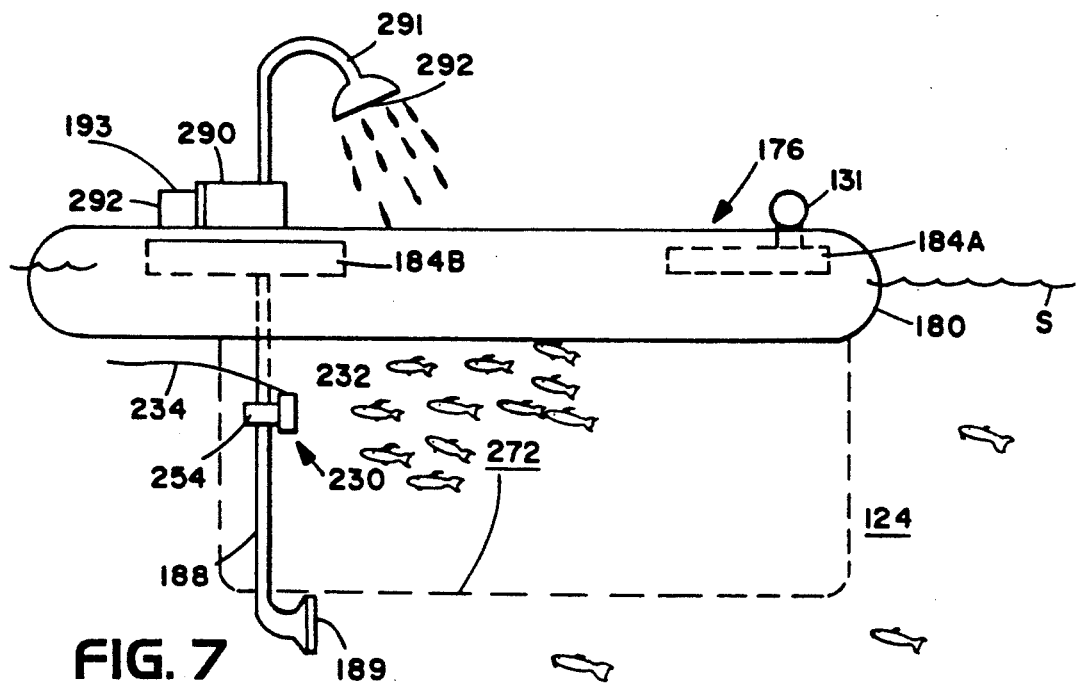
FIG. 7 is a partial side view of another illustrative example embodiment of the invention.

FIG. 7 shows another variation of the embodiment of FIGS. 2-5 wherein a fish monitor 230 includes a sensor 232 mounted by bracket 254 to the intake pipe 188. The sensor 232 is connected by line 234 to the controller 28. A pump 290 and motor 292 are mounted on the aft brace 184A. An outlet manifold 291 from the pump 290 leads to a spray nozzle or spray head 292, which sprays aerated droplets D into a sub-volume 272 (framed in FIG. 7 by broken lines) existing between and below the two tubes 180 of the flotation device 176. Thus, the relatively unbounded oxygen enriched sub-volume 272 is provided beneath the spray nozzle 292, with the sensor 232 directed toward the sub-volume 272.

It should be understood that the sensor 232 of the embodiment of FIG. 7 can take various forms, including (for example) an acoustic transducer or a photoelectric device (such as a reflective photoelectric head).

Figure 8:
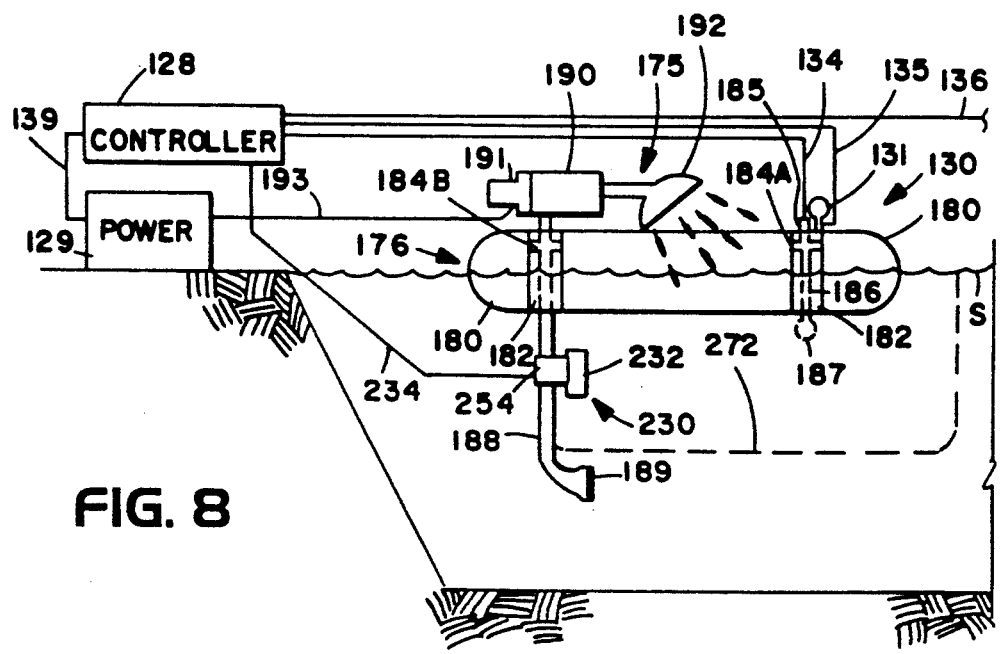
FIG. 8 is a partial side view of another illustrative example embodiment of the invention.

FIG. 8 shows another embodiment wherein both the fish monitor 230 of FIG. 7 and the fish monitor 130 of FIGS. 2-5 are employed for monitoring a sub-volume (framed by broken line 272). As in the embodiment of FIG. 7, no boundary structure is provided for defining the sub-volume 272.

Figure 9:
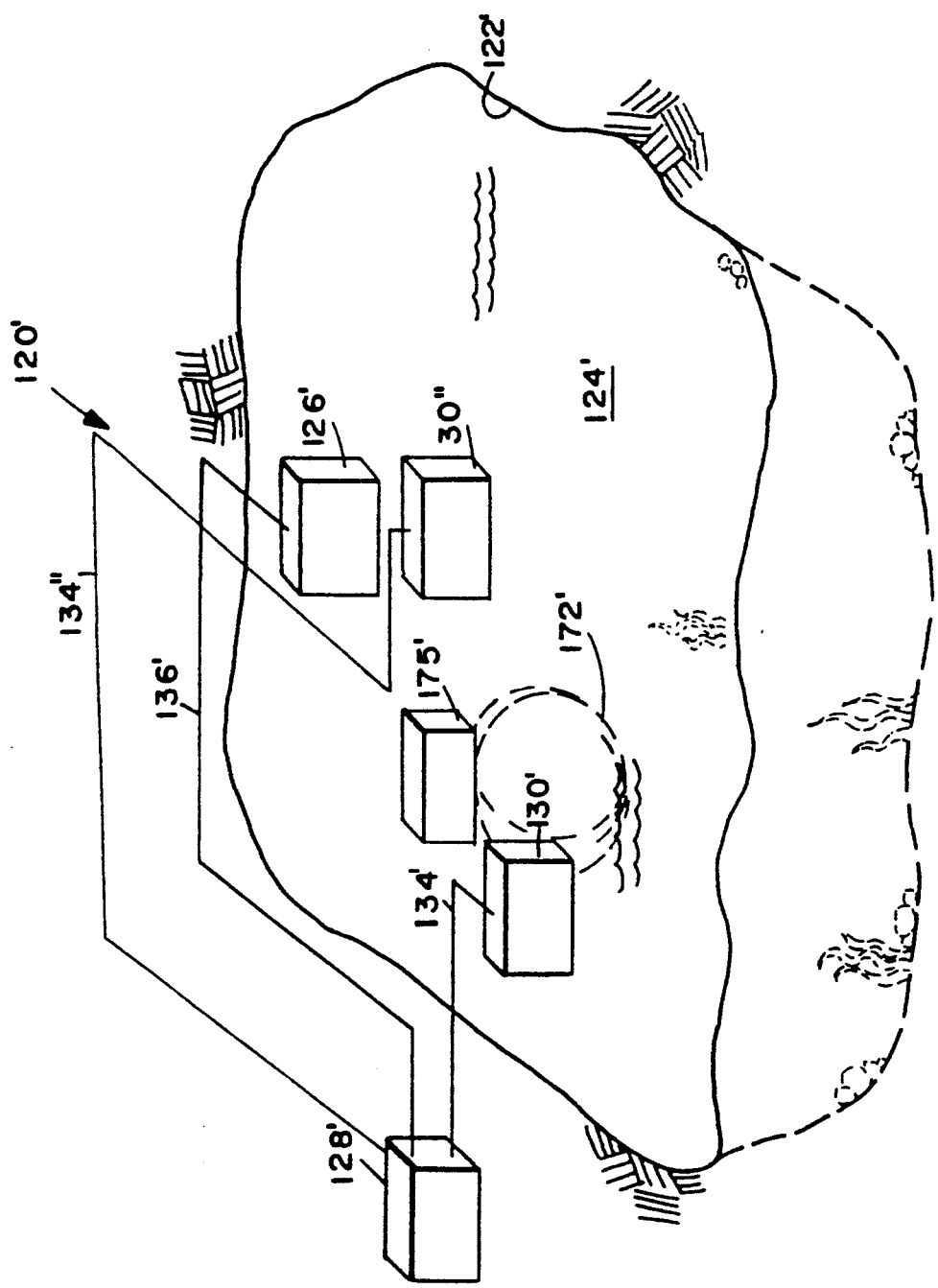
FIG. 9 is a schematic view of an automatic oxygenation system according to another illustrative example embodiment the invention.

FIG. 9 shows an automatic oxygenation system 120' which is a variation of the system of FIG. 2. As used hereinafter, primed reference numerals in the FIG. 9 embodiment refer to similar structure in the FIG. 2 embodiment. In this regard, the system 120' of the embodiment of FIG. 9 is installed in a volume 124' of fresh water contained in a catfish pond 122'. The system 120' includes a primary oxygen-supplying aeration system 126'; a controller 128'; and, a primary fish monitor 130' for monitoring the activity in a sub-volume 172' which is aerated by a sub-volume aerator 175'. The primary fish monitor 130' is connected by line 134' to the controller 128'. The controller 128' is in turn connected by line 136' to the primary aeration system 126'.

The system 120' of FIG. 9 primarily differs from the system 120 of FIG. 2 by providing by a secondary fish monitor 30" proximate the primary aerator 126'. The secondary fish monitor 30" is connected by line 134" to the controller 128'. The operation of the system 120' of the embodiment of FIG. 9 is hereinafter described with reference to FIG. 13.

Figure 10:
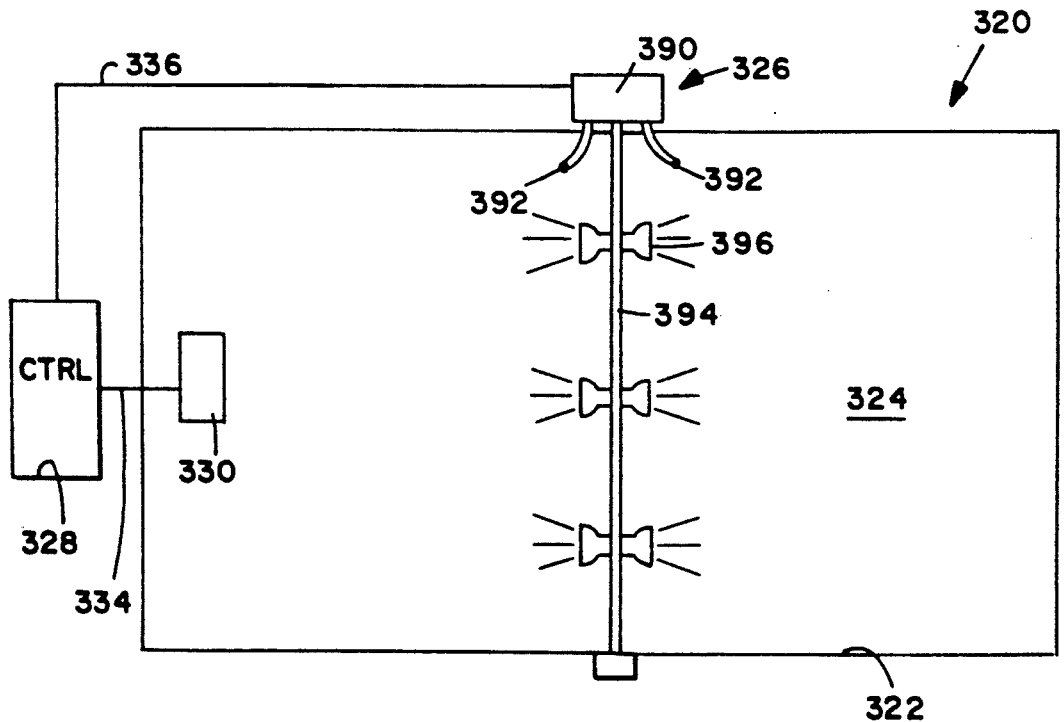
FIG. 10 is a top schematic view of an automatic oxygenation system according to another mode of the invention.

FIG. 10 shows an automatic oxygenation system 320 which is an example installation at a catfish pond 322 of another variation of the system of FIG. 1. A volume 324 of fresh water is contained in the pond 322. The system 320 includes an oxygen-supplying aeration system 326; a controller (also known as a depletion determination controller) 328; and, a fish monitor 330. The fish monitor 330 is connected by line 334 to the controller 328. The controller 328 is in turn connected line 336 to the aeration system 326.

The system 320 of FIG. 10 primarily differs from the system 20 of FIG. 1 by providing a plurality of aerators as part of aeration system 326. In particular, the aeration system 326 includes a pump unit 390 which is electrically powered by an unillustrated power supply. Intake pipes 392 submerged in the volume 324 of pond 322 supply water to the pump 390. An output manifold 394 from the pump 390 extends across the pond 322 and has a plurality of aeration spray nozzles 396 in fluid communication therewith. The nozzles 396 are spaced along the manifold 394 to provide an aerating spray at differing locations of the pond 322.

Figure 14:
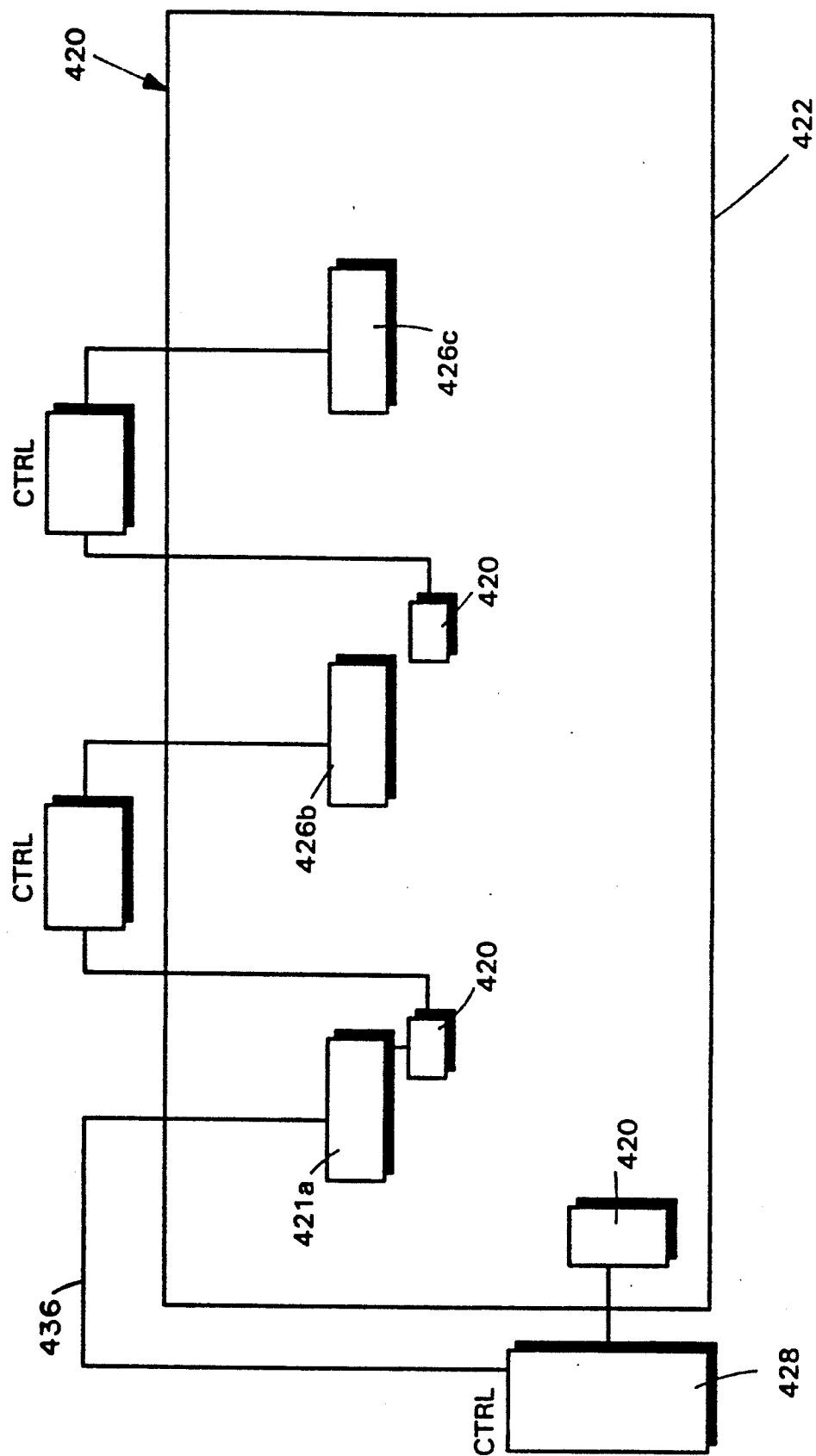
FIG. 14 is a top schematic view of nesting embodiment of the invention with multiple primary aerators.

FIG. 14 shows an automatic oxygenation system 420. The system is another variation of the system shown in FIG. #10. The system 420 primarily differs from the system 320 in that the primary aerator 426a serves as the sub-volume aerator for the monitor for the second primary aerator (426b). Likewise, the second primary aerator (426b) after it has become activated serves as the sub-volume aerator for the monitor of the third primary aerator (426c).

Although FIG. 14 shows the controller for the second primary aerator (426b) and the third primary aerator (426c) as separate units, it should be understood that these controllers may be an integral part of the main controller (428) for this nesting embodiment of the invention.

The operation of the invention will now be discussed, primarily with reference to the embodiment of FIGS. 2–5. In operation, the sub-volume or sample aerator 175 provides a small, consistent, and localized supply of oxygen to the pond sub-volume 172. The sub-volume 172 thereby has a dissolved oxygen level that exceeds the average dissolved oxygen level of the remainder of the pond 122 generally. Should the remainder of the pond 122 have a sufficiently high level of dissolved oxygen, the catfish F therein (being rather non-gregarious and un-schooled fish) will not tend to densely congregate in the sub-volume 172 and the primary aerator 126 is not activated. Accordingly, signals generated on line 134 to the controller 128 by the fish monitor 130 will be within the preset and predetermined normal ranges expected by the controller 128.

Should a portion of the pond 120 begin to suffer oxygen depletion, the catfish F will innately seek out oxygen in the manner described above and will congregate in the oxygen-enriched sub-volume 172. The increased numbers of catfish F congregating in the sub-volume 172 will be detected by the fish monitor 130 which monitors the sub-volume 172. The signals applied to the controller 128 from the monitor 130 will be indicative of a greater count of fish F in the sub-volume 172, or greater movement of fish F into the sub-volume 172. When the controller 128 determines that the signals received by the fish monitor 130 exceed the predetermined ranges, the controller 128 activates the audible alarm 166 and issues an activation signal to the aerator device 126. The aerator device 126 operates in conjunction with the controller 128 (in a manner understood from the earlier description of the embodiment of FIG. 2) to supply supplemental oxygen to portions of the pond 122 other than the sub-volume 172. After a sufficient amount of oxygen has been dissolved in the water in the pond, the catfish F will begin to de-populate the sub-volume 172. In order to attain a sufficient level of dissolved oxygen, the controller 128 preferably activates the primary aerator 126 for a minimum predetermined time interval. If, at the expiration of that minimum time interval, the fish monitor 130 still detects over-population of the sub-volume 172, the controller 128 will again activate the primary aerator 126.

The controller 128 operates on the basis of a set of coded instructions stored in its ROM. Steps executed by the controller 128 in a basic mode of operation are shown in FIG. 11, while steps executed by the controller 128 in a verification mode of operation are shown in FIG. 12.

Figure 11:
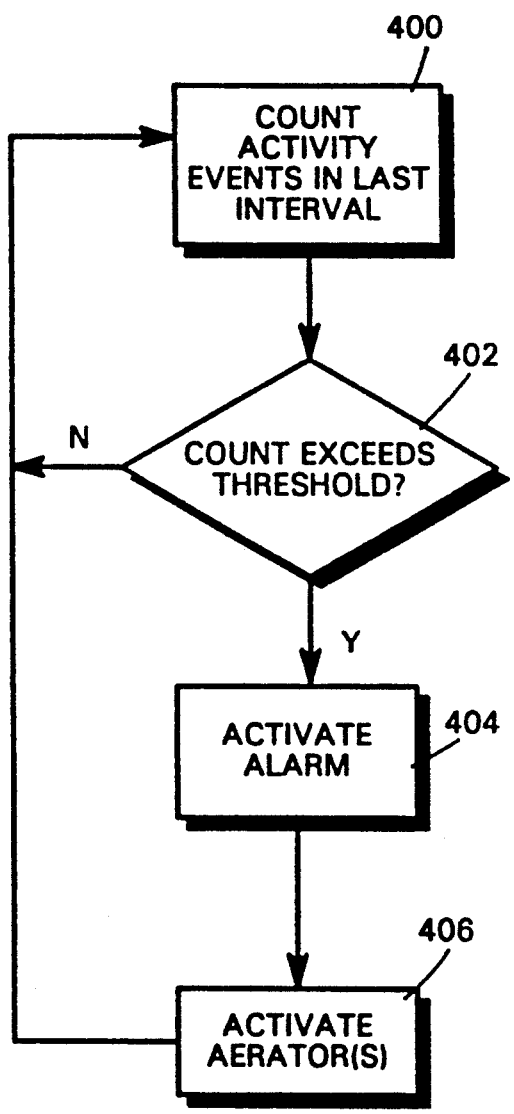
FIG. 11 is a flowchart showing steps executed by a controller of the invention in accordance with a basic mode of operation.
Figure 12:
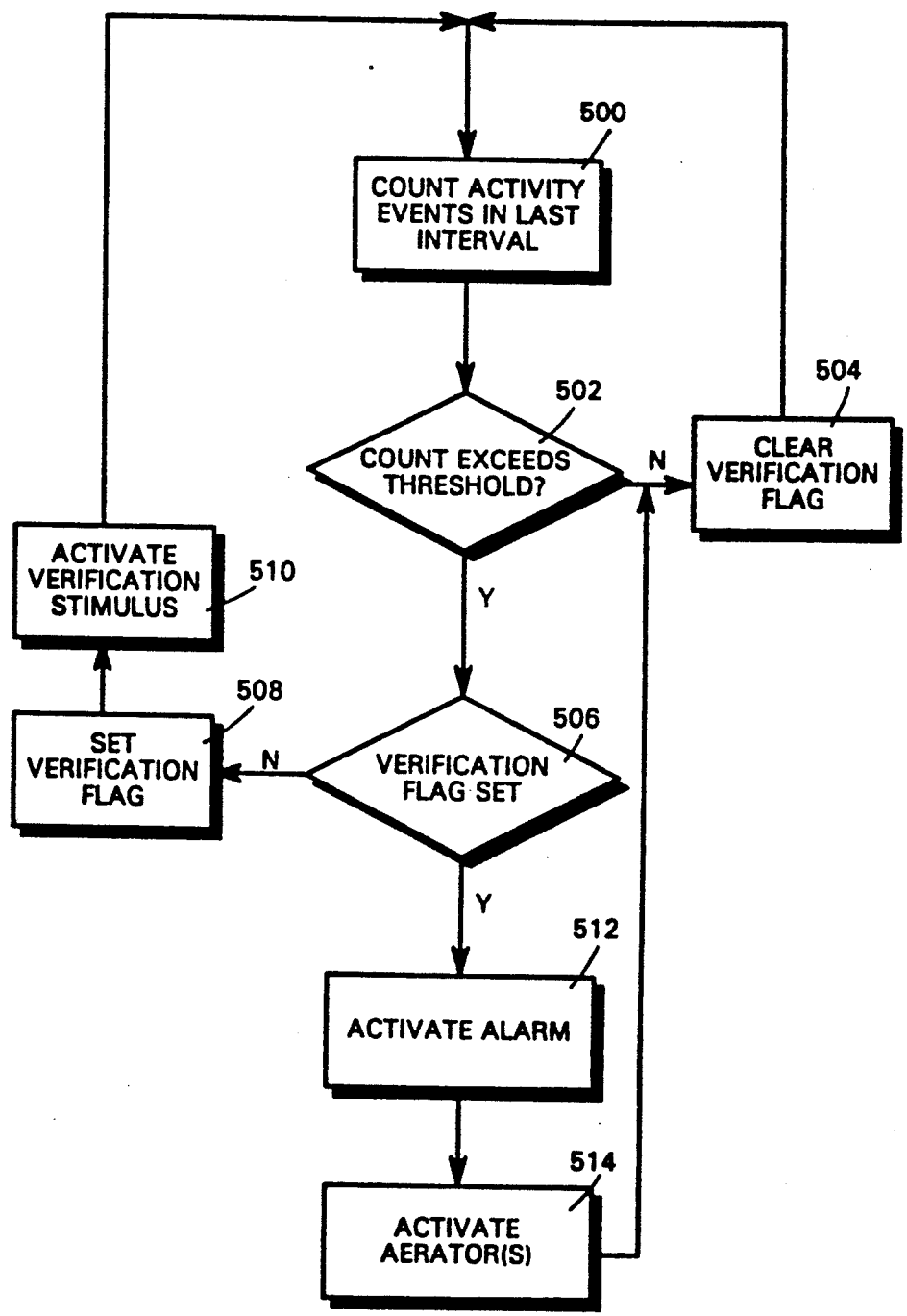
FIG. 12 is a flowchart showing steps executed by a controller of the invention in accordance with a verification mode of operation.

Referring to the basic mode of operation shown by FIG. 11, after being initialized the controller 128 executes a loop including even numbered steps 400 through 406. At step 400, the controller 128 counts activity events occurring in a most recent time interval. That is, the controller 128 keeps track of the number of signals received on line 134 from the fish monitor 130 during a most recent time interval. In the embodiment of FIGS. 2–5, a signal is created on line 134 by the microswitch 185 with each deflection of the feeler lever 186. Thus, in monitoring the "activity" of the fish, the fish monitor 130 generates signals which are indicative of the frequency with which the monitor 130 is contacted, which in turn is indicative of the number of fish in the sub-volume 172 and/or movement of fish into the sub-volume 172. With respect to the most recent time interval, the controller 128 maintains a count over a moving time interval (e.g., the last minute of elapsed time).

At step 402 the controller determines whether the number of event counts during the last time interval exceeds a predetermined threshold which is indicative of oxygen depletion. If the threshold is not exceeded, the controller 128 returns to step 400 in connection with its continual monitoring of the sub-volume 172.

If the number of event counts during the last time interval does exceed the predetermined threshold, thereby indicating oxygen depletion, the controller 128 turns on the alarm 166 (at step 404) and activates the primary aerator 126 (step 406). As indicated above, the aerator 126 stays on a predetermined length of time before being de-activated. After de-activation of the aerator 126, the controller 128 resumes execution of its loop at step 400.

The verification mode of operation, illustrated in FIG. 12, involves execution of even numbered steps 500–514, which basically include steps similar to the basic mode of FIG. 11 unless otherwise noted. Steps 500 and 502 are essentially identical with steps 400 and 402, respectively, of FIG. 11. However, when the event counts are determined at step 502 not to exceed the threshold, the controller clears a verification flag in its memory (at step 504) before looping back to step 500.

If, in the verification mode, the event counts exceed the threshold, the controller 128 realizes that an oxygen depletion condition may exist. Rather than perhaps prematurely turn on the aerator 126, the controller 128 attempts to determine whether the signals on line 134 from the fish monitor are attributable to a reason other than oxygen depletion. To this extent, at step 508 the controller 128 turns on the verification flag (assuming that it has not previously been set) and then activates the verification stimulus 131 by sending an appropriate signal thereto on line 135. In the illustrated embodiment, the verification stimulus 131 is a light which, under non-depletion conditions, would sufficiently frighten the fish and de-populate the oxygen-rich sub-volume 172.

Then, after a slight pause, the controller 128 returns to step 500 to again check the level of activity in the oxygen-rich sub-volume 172. If the fish activity (determined at step 502) is still indicative of oxygen depletion, and if the verification flag has been set (checked at step 506), the controller activates both the alarm 166 (at step 512) and the primary aerator 126 (at step 514). As in the basic mode, the primary aerator 126 remains on for a predetermine time before the controller returns to step 500, clearing the verification flag en route (step 504).

Figure 13:
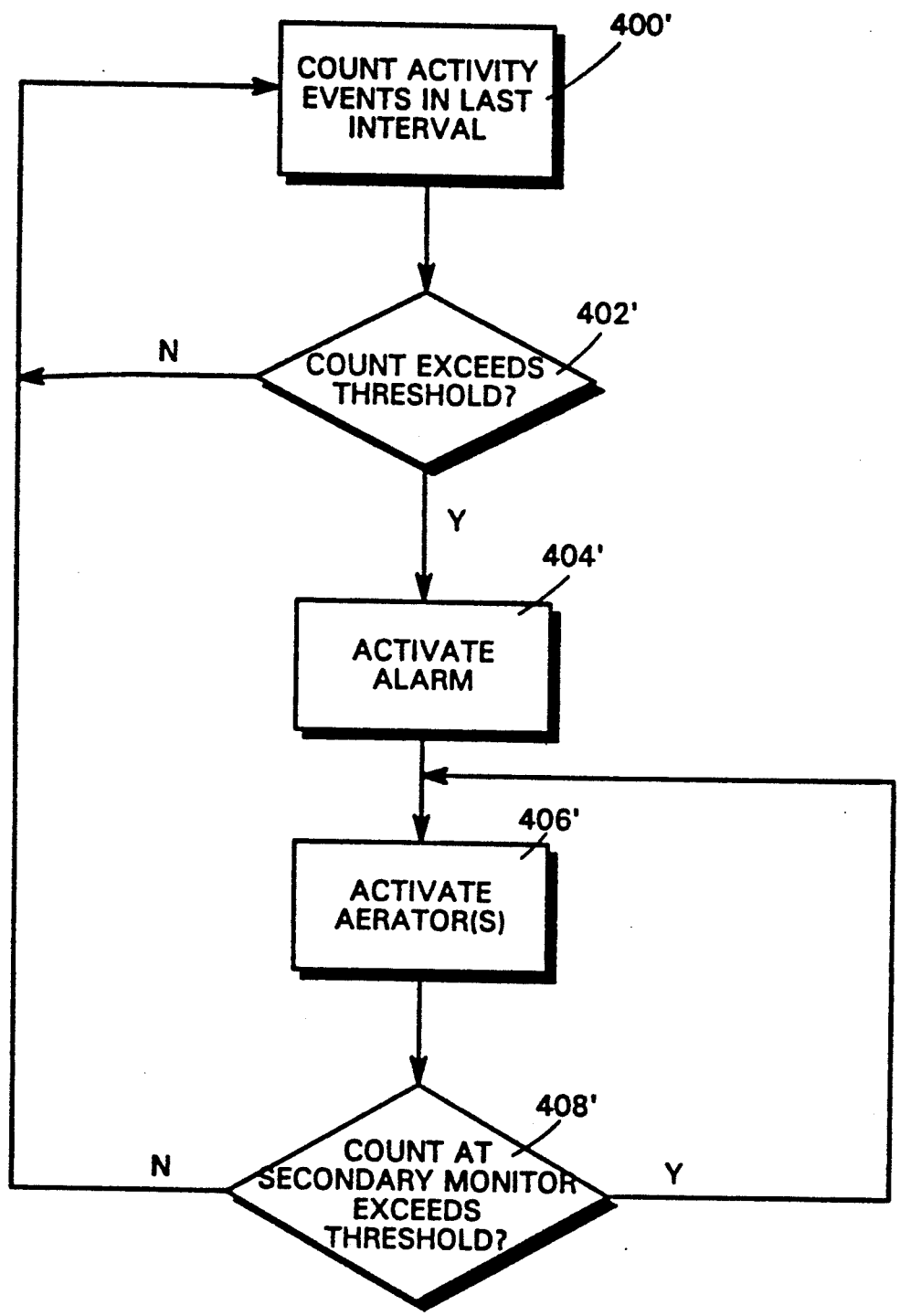
FIG. 13 is a flowchart showing steps executed by a controller of the invention in accordance with a fail-safe mode of operation.

The system 120' of the embodiment of FIG. 9 operates in a fail-safe mode as explained with reference to the steps shown in FIG. 13. Even numbered steps 400' through 406' of FIG. 13 are essentially identical with correspondingly unprimed steps 400 through 406 of the basic mode of FIG. 11. The primary difference between the modes of FIGS. 11 and 13 is that, at the end of the predetermined time interval upon which the primary aerator 126' is to turn off, the controller 128' checks the events count at the secondary fish monitor 30″ to determine if the counts at the secondary monitor 30″ exceed a predetermined threshold. Such can occur if oxygen depletion conditions still exist in the pond 122′ and the fish now merely congregate proximate the primary aerator 126′. A high number of event counts at the primary aerator 126′ indicates that the fish are still not relatively uniformly dispersed throughout the pond 122′, which further indicates the possibility of an oxygen depletion condition.

Accordingly, at step 408 the controller 128′ determines whether the events count from the secondary fish monitor 30″ exceeds a predetermined threshold. If not, depletion conditions are presumed to be overcome and execution returns to step 400′. If the events count from monitor 30″ exceeds the threshold, execution jumps back to step 406′ to re-activate the primary aerator 126 for another predetermined interval of time.

It should be understood with reference to the steps of FIG. 13 that the determination of step 408 can be performed as a prerequisite to turning off the primary aerator 126′, rather than preformed as a check after termination.

Other variations of operation are implemented in other embodiments. In order to prevent false triggering of the alarm 166, or unnecessary activation of the primary aerator 126, the controller 128 can average or otherwise weigh the signals in accordance with preset criteria. For example, in an embodiment such as FIG. 8 including two types of fish monitors, the controller 128 may require that the signals from both monitors 130 and 230 exceed predetermined threshold levels for the respective monitors before an conclusion of oxygen depletion is reached. Such is particularly beneficial should one type of monitor be prone to false triggering, as would perhaps a physical surface monitor when a stick floats on the water surface. The controller 128 can also be programmed to conduct a "recount" or redetermination in a subsequent time interval if the input signals so warrant. Advantageously, the user can tailor the depletion conclusion criteria with reference to the characteristics of the pond and type of fish being monitored.

Accordingly, rather than rely upon indirect sensor apparatus readings of whether fish are receiving sufficient oxygen, the embodiments of the present invention provide a direct indication by monitoring the innate behavior of the fish themselves. The automatic features of the present invention reduce the labor intensity heretofore involved in aquacultural monitoring. Moreover, the present invention engenders substantial energy savings and prolonged equipment life. Quite significantly, the aquaculture is better protected and the quality thereof assured.

While the invention has been particularly shown and described with reference to the preferred embodiments thereof, it will be understood by those skilled in the art that various alterations in form and detail may be made therein without departing from the spirit and scope of the invention. For example, the types of aeration devices illustrated herein are merely examples. Other types of aerators and/or other combinations of aerators can be employed, including (for example) those which include paddlewheels, those which mechanically mix or agitate water in the pond, those which pump water into the air, those which pump air into water, and those which pump water from another source (such as a ground well) into the pond. Likewise, it should be understood that the rates of activity of some of these types of aeration devices, for example, agitators, can be varied in accordance with output signals thereto from the controller. Moreover, it should also be understood that the invention is not limited to the use of a single aerators for creating an oxygen-rich sub-volume, and that a plurality of oxygen-rich sub-volumes may be created in differing regions of a pond.

Further, the invention is not limited to the particular types of fish monitors mentioned in the foregoing examples. Other types of detector and/or monitoring apparatus can be employed, including physical detectors, video cameras, laser, sonar, and acoustical detectors.

Likewise, auxiliary structure and equipment may be employed in connection with the fish monitors and aerators, such as netting or a cage around a submerged aerator to prevent fish from contacting the aerator.

Although shown in the illustrated embodiments as being mounted upon flotation devices, the fish monitors described herein can be located in other manners. For example, the fish monitors can be secured to a pier or dock, or suspended from a boom. Alternatively, the monitors can be mounted to a stake or piling anchored in the pond bottom, or attached to the primary aerator.

The boundary frame 174 is optional, and can take from other than a rectangle. In fact, one or more ends of the boundary frame may be left open. In addition, the boundary frame may have a bottom.

The embodiments of the invention in which an exclusive property or privilege is claimed are defined as follows:

1. Apparatus for automatically controlling a supply of oxygen to a volume of water wherein aquacultural creatures reside, the apparatus comprising:
   a source of oxygen for supplying oxygen to the volume of water;
   a monitor for monitoring the activity of aquacultural creatures residing in the volume of water and for generating an activity signal in accordance with the monitored activity;
   an oxygen depletion determination device connected to the monitor for determining whether the monitored activity is indicative of oxygen depletion in the volume of water and for generating a depletion signal in accordance with the determination;
   in response to the depletion signal, activating the source of oxygen.

2. The apparatus of claim 1, further comprising means for creating an oxygen-rich sub-volume in a predetermined location of the volume of water, the oxygen-rich sub-volume being richer in oxygen than the volume of water generally, and wherein the monitor monitors the activity of aquacultural creatures with respect to the oxygen-rich sub-volume.

3. The apparatus of claim 2, wherein the monitor monitors the activity of aquacultural creatures in the oxygen-rich sub-volume.

4. The apparatus of claim 2, wherein the monitor includes a detector for monitoring the activity of the aquacultural creatures and wherein the depletion determination device includes a processor for making the determination whether the activity is indicative of oxygen depletion in the volume of water.

5. The apparatus of claim 1, wherein the monitor comprises a plurality of detectors.

6. The apparatus of claim 1, wherein the monitor comprises a plurality of types of detectors.

7. The apparatus of claim 1, wherein the monitor monitors the activity of aquacultural creatures above a predetermined depth of the volume of water.

8. The apparatus of claim 1, wherein the monitor monitors the activity of aquacultural creatures proximate a surface of the volume of water.

9. The apparatus of claim 1, wherein the monitor includes means for acoustically monitoring the activity of the aquacultural creatures.

10. The apparatus of claim 1, wherein the monitor includes means for photo-optically monitoring the activity of the aquacultural creatures.

11. The apparatus of claim 1, further comprising an alarm responsive to the depletion signal for providing an indication of oxygen depletion.

12. The apparatus of claim 1, further comprising a verification stimulus device connected to the depletion determination device for providing a stimulus to the volume of water upon an initial determination of oxygen depletion, and wherein after the provision of the stimulus the depletion determination device does not activate the oxygen supplying means unless the monitored activity after provision of the stimulus is indicative of oxygen depletion in the volume of water.

13. Apparatus for automatically controlling a supply of oxygen to a volume of water wherein aquacultural creatures reside, the apparatus comprising:
a source of oxygen for supplying oxygen to the volume of water;
means for creating an oxygen-rich sub-volume in a predetermined location of the volume of water, the oxygen-rich sub-volume being richer in oxygen than the volume of water generally, wherein the means for creating an oxygen-rich sub-volume comprises:
means for defining at least a partial boundary for the sub-volume; and,
means for oxygenating water in the sub-volume;
a monitor for monitoring the activity of aquacultural creatures in the oxygen-rich sub-volume;
a processor connected to the monitor for determining whether the monitored activity is indicative of oxygen depletion in the volume of water and, in response to the determination, activating the oxygen source.

14. The apparatus of claim 13, further comprising a flotation device for carrying the boundary defining means and the monitor.

15. A method for automatically controlling a supply of oxygen to a volume of water wherein aquacultural creatures reside, the method comprising:
using a sensor to monitor the activity of aquacultural creatures residing in the volume of water and generating a signal and generating a signal when the monitored activity is indicative of oxygen depletion in the volume of water; and,
in response to the signal, supplying oxygen to the volume of water.

16. The method of claim 15, wherein the activity of aquacultural creatures above a predetermined depth of the volume of water is monitored.

17. The method of claim 16, wherein the activity of aquacultural creatures proximate a surface of the volume of water is monitored.

18. The method of claim 15, wherein the monitoring step includes acoustically monitoring the activity of the aquacultural creatures.

19. The method of claim 15, wherein the monitoring step includes photo-optically monitoring the activity of the aquacultural creatures.

20. The method of claim 15, further comprising activating an alarm means in response to a determination of an indication of oxygen depletion.

21. A method for automatically controlling a supply of oxygen to a volume of water wherein aquacultural creatures reside, the method comprising:
creating an oxygen-rich sub-volume in a predetermined location of the volume of water;
monitoring the activity of aquacultural creatures with respect to the oxygen-rich sub-volume; and,
in response to the determination, supplying oxygen to the volume of water.

22. The method of claim 21, wherein the step of monitoring includes monitoring the activity of aquacultural creatures in the oxygen-rich sub-volume.

23. A method for automatically controlling a supply of oxygen to a volume of water wherein aquacultural creatures reside, the method comprising:
monitoring the activity of aquacultural creatures residing in the volume of water;
making an initial determination whether the monitored activity is indicative of oxygen depletion in the volume of water;
providing a stimulus in the volume of water upon the initial determination of oxygen depletion; then,
making a subsequent determination whether the monitored activity is indicative of oxygen depletion in the volume of water; and,
supplying oxygen to the volume of water in response to the subsequent determination.

24. The method of claim 23, further comprising creating an oxygen-rich sub-volume in a predetermined location of the volume of water, and wherein the determining steps involve monitoring the activity of aquacultural creatures with respect to the oxygen-rich sub-volume.

25. A method for automatically controlling a supply of oxygen to a volume of water wherein aquacultural creatures reside, the method comprising:
(1) creating an oxygen-rich sub-volume in a predetermined location of the volume of water;
(2) monitoring the activity of aquacultural creatures in the oxygen-rich sub-volume of water;
(3) making an initial determination whether the monitored activity in the oxygen-rich sub-volume is indicative of oxygen depletion in the volume of water;
(4) supplying oxygen to the volume of water using a primary aerator in response to the determination of step (3);
(5) monitoring the activity of aquacultural creatures residing proximate the primary aerator;
(6) making a determination whether the monitored activity of step (5) is indicative of oxygen depletion in the volume of water; and,
(7) terminating the supply of oxygen to the volume of water from the primary aerator in response to the determination of step (6).

* * * * *